Nov. 7, 1961 G. S. DOMAN ET AL 3,007,530
HELICOPTER ROTOR HEAD
Filed July 29, 1958 2 Sheets-Sheet 1

INVENTORS
GLIDDEN S. DOMAN
BY STEPHEN DUPONT
MICHAEL C. FRENGLEY

Bohleber, Jacott & Montstream
ATTORNEYS

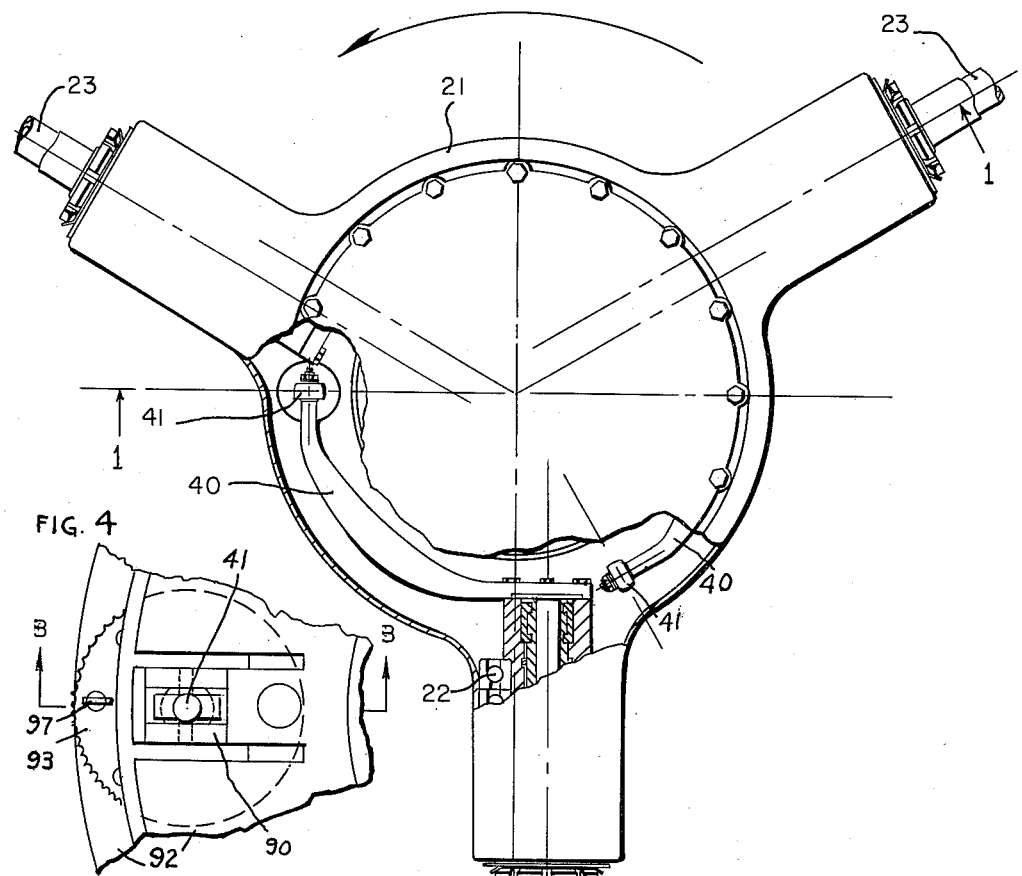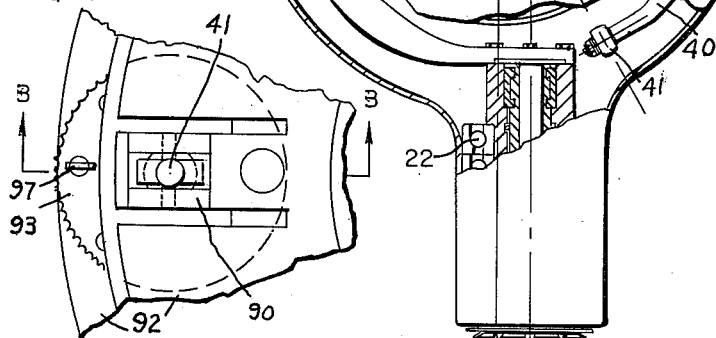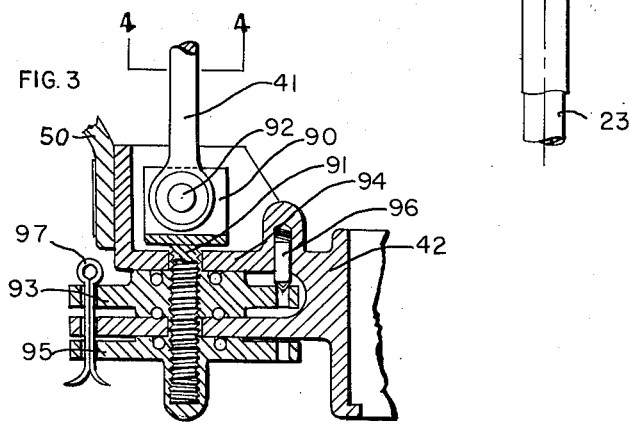

3,007,530
Patented Nov. 7, 1961

3,007,530
HELICOPTER ROTOR HEAD
Glidden S. Doman, Trumbull, Stephen Du Pont, Southbury, and Michael C. Frengley, Danbury, Conn., assignors to Doman Helicopters, Inc., Danbury, Conn., a corporation of Delaware
Filed July 29, 1958, Ser. No. 751,685
16 Claims. (Cl. 170—160.26)

The invention relates to a rotor head or rotor for a self sustaining aircraft such as a helicopter. The rotor head carries blades forming the rotor and each blade has a spar suitably mounted for oscillation on the longitudinal axis of the spar. The rotor of the invention relates to that type of head in which the blades are adjustable for collective pitch control or cyclic pitch control or both types of control. The cyclic pitch control is usually accomplished through a so-called swash plate, the angularity of which with respect to the mast is adjustable in a fore and aft plane as well as a lateral plane.

It is an object of the invention to construct a rotor or rotor head which includes a non-rotatable stub mast mounted on the end of the fixed mast through a universal joint and having a driving shaft with a universal joint in concentric alignment therewith in which the rotor head casing is mounted on bearings above the universal joints so that the swash plate connecting links will rotate in lesser radius circle and associated mechanism may be of lesser radial diametrical dimensions.

Another object of the invention is to provide two flexible housings or boots, one being a driving housing between the rotor head casing and a rotating swash plate of the swash plate means and a second flexible housing between a non-rotatable swash plate of the swash plate means and the mast to completely house the swash plate means and its connecting mechanism.

Another object of the invention is as above and in addition permits location of adjustment for the connecting link between the rotating swash plate of the swash plate means which is exterior of the flexible housings so that it can be adjusted without removing any part of the housing.

A further object of this invention is that the lower swash plate boot enclosure can be provided with sufficient torsional rigidity to restrain the non-rotating swash plate from rotation.

A still further object is to construct a rotor head having a drive shaft with two universal joints therein one above the other so that the drive shaft between the universal joints inclines at an angle with respect with a vertical axis through the upper universal joint so that the motor will not be located beneath a vertical axis through the upper joint and so that optimum cancellation of universal joint torsional velocity transmission may be secured.

Other objects of the invention will be more apparent from the following description when taken in connection with the accompanying drawings illustrating a preferred embodiment thereof in which:

FIG. 2 is a top view of the rotor head showing the blade horns;

FIG. 3 is a detailed view of the adjusting means for the connecting link between a blade horn and the swash plate; and FIG. 4 is a top sectional view of the adjusting means for the connecting link between a blade horn and the swash plate taken on line 4—4 of FIG. 3.

Figure 1:
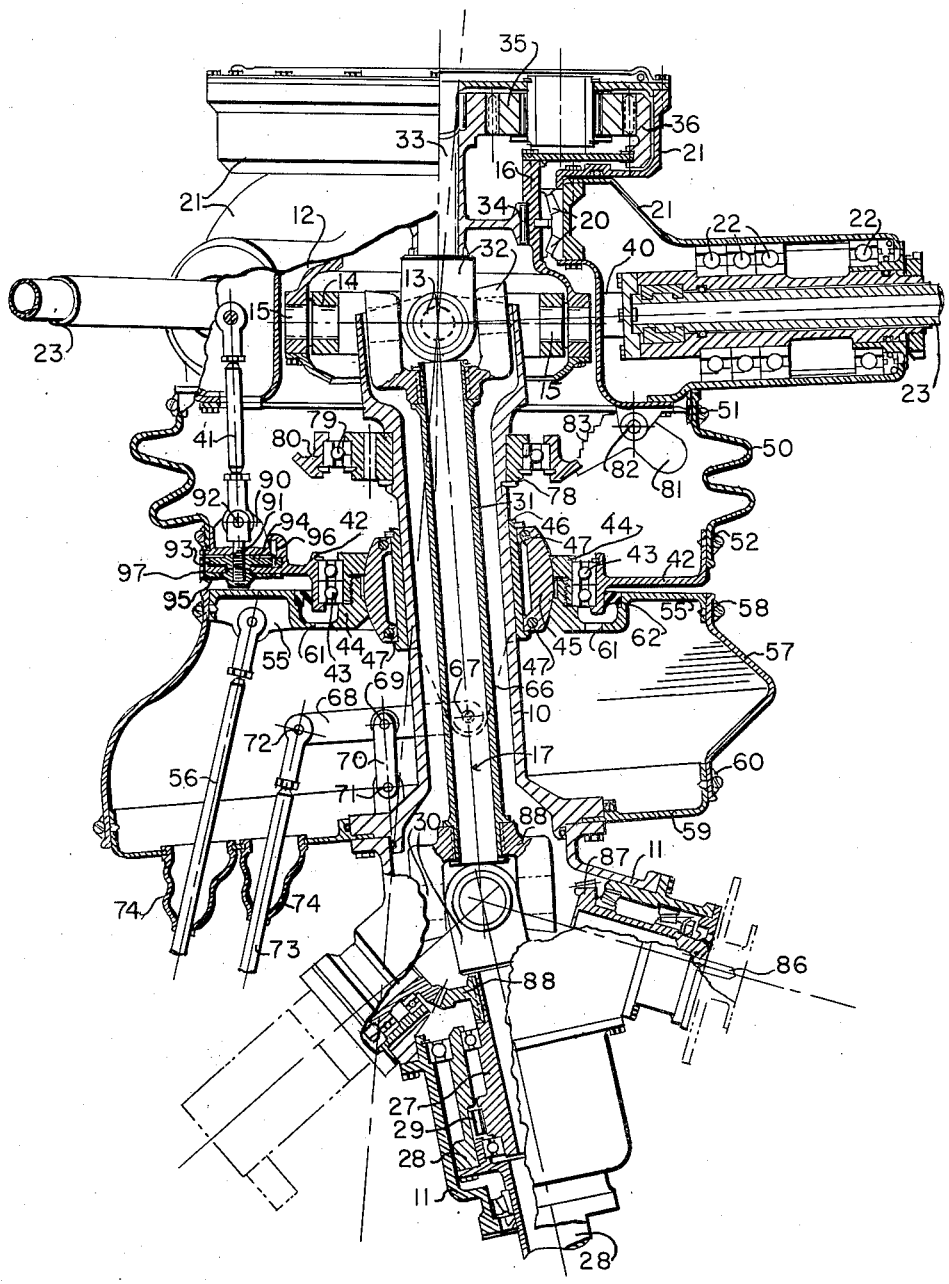
FIG. 1 is a vertical section through the rotor head taken on line 1—1 of FIG. 2.

The rotor head includes a mast 10 which is secured in any suitable manner to the frame of the aircraft. A transmission housing 11 may be provided on the lower end of the mast for a transmission as will be described which is housed therein and this housing is shown as forming a part of the mast. The upper end of the mast carries a universal joint 12 having a bearing 13 connecting the mast with a joint ring 14 which joint ring also carries a bearing 15 spaced 90° from the bearing 13 and connects the mast with a stub mast 16 which is non-rotatively mounted on the stationary mast through the universal joint. The stub mast, however, can change its angular position at will through the range of the universal joint 12.

Above the universal joint on the stub mast 16 is carried bearings 20 upon which is rotatively mounted a hub or casing 21. This casing carries a plurality of sets of bearings 22, each set oscillatably mounting a blade or particularly a blade spar 23 for each blade so that the blades may oscillate around its longitudinal axis. The head shown carries three blades. Four such bearings are shown for mounting each blade, the blade spar only being shown. Preferably the axis of the blade spar lies in a relatively horizontal plane which passes through the common center of the upper universal joints. The axis of the spar as viewed from above is off center somewhat.

The drive connection or shaft between the engine or motor and the casing 21 includes a lower shaft 27 mounted within the transmission housing at an angle with respect to the axis 17 of the mast 10. The lower shaft may be connected with a shaft 28 connected with the motor through a suitable free wheeling device such as roll clutch 29. Within the transmission housing is a universal joint 30 which connects the lower shaft 27 with a mid shaft 31 passing through the mast and the upper end of the mid shaft carries an upper universal joint 32 which connects the mid shaft with a stub shaft 33 which is mounted in the stub mast 16 by bearings 34. A gear reduction unit 35 is preferably connected with the stub shaft, the unit particularly shown being a planetary transmission having a stationary ring gear 36 fixed upon the end of the stub mast 16. The upper universal joint 32 is concentric with the mast universal joint 12. The universal joints 12 and 32 are relatively massive units and being concentric the outside dimension of the mast universal joint 12 is relatively large. In order to reduce the overall dimension of the casing the bearings 20 are above the mast universal joint so that the diameter of these bearings is substantially reduced by their location which in turn enables reduction in the diameter of the hub or casing 21 thereby saving considerable weight in the head. This reduced dimension also permits reduction in the radius of rotation of the connecting links and reduction in diameter and weight of the swash plate means which will be described hereinafter.

Oscillation of the blades for collective pitch control or cyclic pitch control or both is secured through the connection of each blade with a swash plate means. To achieve this each blade spar 23 carries a horn 40, the end of which is connected with a connecting link 41 and the link is connected with the swash plate means. The connections are through suitable pivotal connections. The connecting link is connected with a rotating swash plate 42 of the swash plate means which is rotatably mounted through bearings 43 on a suitable universal joint mounted on the mast. The universal joint particularly shown is of the ball type and includes an outer member 44 having a section of a sphere as its inner diameter which rides on a ball or ball member 45 or portion of a sphere. The outer member is shown in two parts for simplicity in construction and assembly. The outer member 44 may assume any angular position or relation with the ball member 45 within the range of the joint. The ball member is in two parts bolted together by bolts 47 and is secured to a split bushing 46 which is slidably mounted on the mast 10 and held together by the ball member in being received therein and by a spring ring.

A driving connection is provided between the casing 21 and the rotating swash plate 42 through an axially flexible but circumferentially rigid housing 50 which is suitably secured to the casing such as by a clamping ring 51 and is secured to the rotating plate 42 by a suitable clamping ring 52. This housing or boot 50 is tubular and houses or encloses the upper portion of the swash plate mechanism so that oil for the swash plate means as well as the entire upper portion of the rotor head is prevented from leaking out and being thrown centrifugally onto the blades. Oil on the blades would unbalance the rotor head so that the blades would not track in the same track as another blade or blades and failure to track would result in vibration in the head which would cause instability and might be destructive.

The outer member 44 of the swash plate universal joint carries a non-rotating swash plate 55. The outer member as shown comprises two parts one part of which is a part of the non-rotating swash plate. To this plate are connected cyclic control rods 56, one such control rod being connected with the non-rotating swash plate for fore and aft change of the angular position of the swash plate means on the universal joint and a like cyclic control rod (not shown) being connected in a lateral position to control lateral tilting of the swash plate means. With these two control rods the tilt or inclination of the swash plate means with respect to the axis of the mast may be changed as desired. A lower flexible housing or boot 57 is secured to the non-rotating swash plate 55 by a suitable clamping ring 58 and the lower end is secured to the mast such as to a flange 59 by a suitable clamping ring 60. This flexible housing permits the non-rotating plate 55 to assume any angular or tilt position on the mast and with the flange 59 encloses the lower end of the swash plate means. The lower housing 57 also may prevent rotation of the lower swash plate. Furthermore with the rotating swash plate 42 and the non-rotating swash plate 55 having no openings therein there is a complete enclosure of the swash plate means because of the upper housing 50, the swash plates 42, 55 and lower housing 57 and flange 59. A lubrication communication is provided between the interior of the upper housing and the lower housing through the bearings 43 and holes 61 in the lower plates inside of an oil seal 62 between the plates 42 and 55.

Collective control of the blades is secured by sliding the swash plate means on the mast 10. Collective pitch control is secured through an extension 66 carried by the bushing 46 which extension is pivotally connected through a pivot 67 to a lever 68 pivotally mounted on a pivot 69 carried by a floating link 70. This link is pivotally mounted on the mast 10 on a pivot 71. The lever 68 is connected by a pivot 72 to a collective pitch control rod 73 which is controlled by the pilot. The control rods may have sealing boots 74 for their respective rods.

It has been mentioned that the provision of the bearings 20 above the universal joint 12 enables reduction in the distance of the connecting links 41 from the axis of the mast. This construction also enables the erecting means to be provided closer to the axis of the mast. The erecting mechanism particularly shown includes a mounting ring 78 which is of eccentric form secured to the mast. The mounting ring carries a bearing 79 rotatably mounting an abutment ring 80. The casing 21 carries at least one and preferably more than one erecting link 81 pivotally mounted on the casing on a pivot 82. The erecting links have a plurality of steps 83 one of which engages the abutment ring 80 depending upon the angle of inclination of the casing and presses the casing and its blades towards a horizontal plane of rotation when the rotor slows down, after which a second step is engaged to move the rotor casing to a more horizontal position. The erecting mechanism is disclosed in the du Pont application Serial Number 526,198, filed August 3, 1955, now Patent No. 2,928,478.

The transmission may have a connection with the tail rotor through the shaft 86, gear 87 which meshes with a gear 88 on the lower shaft 27.

With the two boot or housing construction described, means for adjusting the length of each connecting link 41 may be provided without requiring removal of an enclosing housing. The connecting link (FIG. 3) is threaded such as through a stub link 90 having a threaded end 91, the stub link being connected to the link 41 by a pivot 92. This stub link is used merely to provide a right angle mounting with the plate 42. On the threads of the stub link is an adjusting nut 93 which is located between the link and the rotating swash plate 42 and a flange 94. Rotation of the nut lengthens or shortens the connecting link. A lock nut 95 may also be used to secure or anchor the adjustment which has been made. The lock nut may have the threaded hole capped to prevent any possibility of oil seepage through the screw threads. The adjusting means may include a click device 96 engaging the adjusting nut so that a known number of clicks will tell what part of a full turn adjustment has been made and a full turn adjustment as well. This adjustment may be made for blade tracking. An anchor pin 97 may be projected through holes in the nuts and plate and flange to be certain that no inadvertent change of adjustment can take place. It is desirable that oil sealing rings be used between the adjusting nut 93 and the flange 94 and swash plate 42 as well as between the lock nut 95 and the swash plate.

The two drive shaft universal joints 30 and 32 are phased 90° apart. That is the angle of the driving pivot for the universal joint 30 is vertical to the sheet in FIG. 1 and is spaced 90° from that of the driving pivot which is in the plane of the sheet of the universal joint 13. In addition the angle between the axis of the lower shaft 27 and the axis of the mid-shaft 31 is half of the average angle of the tilt of the rotor in flight with respect to the vertical. Forward flight is secured by forward tilt of the rotor. The angle of forward tilt will vary based on design, desired forward speed and other factors and will vary in flight due to constantly changing flight conditions such as changes in wind conditions. It will change also under pilot control to change forward speed. Taking all of the variations or the major ones into consideration, there is an average angle of forward rotor tilt and hence of stub shaft tilt. In other words, in the average rotor flight attitude of forward tilt, the angle of the axis of the stub shaft 33 with respect to the axis of the mid shaft 31 is equal to the angle of the axis of the mid-shaft with respect to the axis of the lower shaft and the sum of these two angles is the angle of the stub shaft with a vertical in average flight attitude. So constructed and arranged the two universal joints have equal angles in the average attitude and as a consequence optimum cancellation of universal joint torsional velocity transmission is secured. In other words there is a cancelling of the transmission of non-constant velocity. In other attitudes of the blade tip plane the cancellation is reduced. In addition the motor is located away from the horizontal center of gravity of the helicopter so that the useful load, which changes, may be located to reduce unbalance. Also a universal joint is lighter than gears and hence saves weight.

This invention is presented to fill a need for improvements in a helicopter rotor head. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A rotor head comprising a hollow mast, a rotor casing rotatably mounted on the mast, blades mounted in the rotor casing having a blade spar, a drive shaft mounted within the mast and connected with the rotor casing; swash plate means mounted on the mast including a universal joint having an outer member, a bearing carried by the outer member of the universal joint, a rotatable swash plate mounted on the bearing, and a non-rotatable swash plate carried by the outer member of the universal joint and connected with the rotatable swash plate through the bearing for tilting the swash plate bearing and the rotatable swash plate; control mechanism for the swash plate means including means connected with said non-rotatable swash plate to tilt the same, an axially flexible cylindrical drive housing connecting the rotor casing with the rotatable swash plate and enclosing the head between the rotor casing and the rotatable swash plate, an axially flexible cylindrical housing connected with said non-rotatable swash plate and the mast and enclosing the lower portion of the swash plate means, and connecting means between the rotatable swash plate and each blade spar to give cyclic pitch change to the blades.

2. A rotor as in claim 1 in which the non-rotating swash plate has an extended portion which extends radially beyond the swash plate bearing and enclosing the lower end thereof, the extended portion of the non-rotatable swash plate having drainage holes therethrough adjacent to and connected with the swash plate bearing, and the bearing and the holes providing a lubricating passage therethrough.

3. A rotor as in claim 2 including an oil seal between the rotatable swash plate and the non-rotatable swash plate radially beyond the drainage holes.

4. A rotor as in claim 1 in which the connecting means between the rotatable swash plate and the blade spar includes a connecting link having a threaded end projecting through a part of the rotatable swash plate, and an exposed adjusting nut carried by the threaded end and retained by the rotatable swash plate.

5. A rotor as in claim 4 in which the connecting link includes a pivotally connected stub link, and the threads being carried by the stub link.

6. A rotor as in claim 5 in which the rotatable swash plate carries a flange spaced from the swash plate, and the adjusting nut is received between the swash plate and flange.

7. A rotor as in claim 2 in which the connecting means between the rotatable swash plate and the blade spar includes a connecting link having a threaded end projecting through a part of the rotatable swash plate and an exposed nut on the threaded end and retained by the rotatable swash plate.

8. A rotor head comprising a hollow mast including a mast universal joint on the end of the mast and a stub mast carried by the mast universal joint having a diameter above the universal joint substantially less than that of the joint, a rotor casing rotatably mounted on the stub mast above the universal joint, blades mounted in the rotor casing each having a spar and the spar having an axis, a drive shaft mounted within the mast and connected with the rotor casing; swash plate means mounted on the mast including a universal joint having an outer member, a bearing carried by the outer member of the universal joint, a rotatable swash plate mounted on the bearing, and a non-rotatable swash plate carried by the outer member of the universal joint and connected with the rotatable swash plate through the bearing for tilting the swash plate; control mechanism for the swash plate means including means connected with the non-rotatable swash plate to tilt the same fore and aft and laterally, an axially flexible cylindrical drive housing connecting the casing with the rotatable swash plate and enclosing the rotor head between the casing and the rotatable swash plate, an axially flexible cylindrical housing connected with the non-rotatable swash plate and the mast and enclosing the lower portion of the swash plate means, and a connection between the rotatable swash plate and each blade spar to give cyclic pitch change to the blades.

9. A rotor head as in claim 8 in which the drive shaft includes a shaft universal joint concentric with the mast joint, a stub shaft connected with the shaft universal joint, and the rotor casing being connected with the stub shaft.

10. A rotor head as in claim 8 in which the shaft below the mast joint is a mid-shaft inclined forwardly at its upper end and at an angle of half the average forward inclination of the rotor casing in flight, a lower universal joint connected with the lower end of the mid-shaft, and a lower drive shaft connected with the lower universal joint and mounted in the mast at an angle with respect to the mid shaft with the upper end forwardly inclined and which angle is half of the average angle of forward tilt of the rotor in flight.

11. A rotor head as in claim 10 in which the upper shaft universal joint and lower shaft universal joint have driving pivots and these pivots are phased 90° apart.

12. A rotor head as in claim 10 including a rotor erecting means, the erecting means having a forwardly extending eccentric mounting ring on the mast with the center of the eccentric in vertical alignment with the center of the mast universal joint, an abutment ring rotatably mounted on the eccentric mounting ring, and at least one erecting link carried by the casing.

13. A rotor head comprising a hollow mast, a mast universal joint on the end of the mast and a stub mast carried by the mast universal joint, a rotor casing rotatably mounted on the stub mast, blades mounted in the rotor casing each having a spar; a drive shaft mounted within the mast including a mid-shaft, a universal joint connected at the upper end of the mid-shaft and concentric with the mast joint, a stub shaft connected with the universal joint and mounted in the rotor casing and connected with the rotor casing, a lower universal joint on the other end of the mid-shaft, a lower shaft mounted in the mast and connected with the lower universal joint, the mid-shaft being inclined from the vertical with its upper end forwardly inclined and at an angle which is half the average angle of forward tilt of the rotor casing in flight, and the lower shaft being mounted at an angle with respect to the mid-shaft with the upper end forwardly inclined and which angle is half of the average angle of forward tilt of the casing in flight; swash plate means mounted on the mast including a universal joint having an outer member, a bearing carried by the outer member of the universal joint, a rotatable swash plate mounted on the bearing, and a non-rotatable swash plate carried by the outer member of the universal joint and connected with the rotatable swash plate through the bearing for tilting the bearing and the rotatable swash plate. control mechanism for the swash plate means including means connected with non-rotatable swash plate to tilt the same, a connection between the rotatable swash plate and each blade spar to give cyclic pitch change to the blades.

14. A rotor head as in claim 13 in which the upper shaft universal joint and the lower shaft universal joint having driving pivots and these pivots are phased 90° apart.

15. A rotor head as in claim 13 including a rotor erecting means, the erecting means having an eccentric mounting ring on the mast with the eccentric center being in vertical alignment with the center of the mast universal joint, an abutment ring rotatably mounted on the eccentric mounting ring, and at least one erecting link carried by the casing.

16. A rotor head comprising a hollow mast including a mast universal joint on the end of the mast and a stub mast carried by the mast universal joint, the stub mast having an upper portion above the universal joint with a diameter substantially less than that of the joint, bearing means carried solely by the upper portion, a rotor casing rotatably mounted on the stub mast above the universal joint and the bearing means being the sole bearing means for the casing, the casing extending below the universal joint and adjacent thereto, blades mounted outside of and on the rotor casing each having a spar, a drive shaft mounted within the mast and a stub shaft mounted within the stub mast, a shaft universal joint connecting the drive shaft and stub shaft, the stub shaft being connected with the rotor casing; swash plate means mounted on the mast including a universal joint having an outer member, a bearing carried by the outer member of the universal joint, a rotatable swash plate mounted on the bearing, and a non-rotatable swash plate carried by the outer member of the universal joint and connected with the rotatable swash plate through the bearing for tilting the swash plate; control mechanism for the swash plate means including means connected with the non-rotatable swash plate to tilt the same fore and aft and laterally, a connection between the casing with the rotatable swash plate, and a connection between the rotatable swash plate and each blade spar to give cyclic pitch change to the blades.

References Cited in the file of this patent

UNITED STATES PATENTS

| | | |
|---|---|---|
| 2,524,853 | Szekely | Oct. 10, 1950 |
| 2,537,623 | Campbell | Jan. 9, 1951 |
| 2,761,521 | Pullin | Sept. 4, 1956 |
| 2,780,080 | Cork | Feb. 5, 1957 |
| 2,861,640 | DuPont | Nov. 25, 1958 |